United States Patent
Hill (10) Patent No.: US 9,010,062 B2
(45) Date of Patent: Apr. 21, 2015

(54) MULTI-PIECE HANGER FOR A POST-TO-BEAM CONNECTION

(71) Applicant: Oz-Post International, LLC, Richardson, TX (US)

(72) Inventor: Ian A. Hill, Plano, TX (US)

(73) Assignee: Oz-Post International, LLC, Richardson, TX (US)

( * ) Notice: Subject to any disclaimer, the term of this patent is extended or adjusted under 35 U.S.C. 154(b) by 0 days.

(21) Appl. No.: 13/926,351

(22) Filed: Jun. 25, 2013

(65) Prior Publication Data

US 2013/0340375 A1    Dec. 26, 2013

Related U.S. Application Data

(60) Provisional application No. 61/663,979, filed on Jun. 25, 2012.

(51) Int. Cl.
*E04B 1/38* (2006.01)
*E04B 1/19* (2006.01)

(52) U.S. Cl.
CPC .................. *E04B 1/1903* (2013.01)

(58) Field of Classification Search
CPC ........... E04B 1/38; E04B 1/40; E04B 1/2612; E04B 2001/2415; E04B 2001/2457; E04B 2001/405; E04B 7/02; E04H 12/22; E04H 14/00
USPC ....................... 52/648.1, 655.1, 656.1, 656.9, 52/645–646, 650.3, 169.9, 479, 481.1, 52/481.2, 262–263, 698–702, 712–715, 52/92.1, 92.2, 93.1, 573.1, 489.1, 52/275–276, 278–279, 243.1; 248/218.4, 248/219.2, 219.4, 295.11, 216.1, 228.1; 403/205, 205 X, 231, 403 R, 363, 382, 403/400 X, 403
See application file for complete search history.

(56) References Cited

U.S. PATENT DOCUMENTS

| | | | | |
|---|---|---|---|---|
| 1,970,422 A | * | 8/1934 | Foster | 403/300 |
| 2,869,694 A | * | 1/1959 | Breckheimer | 52/658 |
| 3,632,146 A | * | 1/1972 | Buzby et al. | 52/285.2 |
| 4,074,882 A | * | 2/1978 | Anderson | 248/208 |
| 4,479,737 A | * | 10/1984 | Bergh et al. | 403/382 |
| 4,514,952 A | * | 5/1985 | Johansson | 52/713 |
| 4,575,983 A | * | 3/1986 | Lott et al. | 52/544 |
| 5,307,603 A | * | 5/1994 | Chiodo | 52/698 |
| 5,392,581 A | * | 2/1995 | Hatzinikolas et al. | 52/712 |
| 5,513,476 A | * | 5/1996 | Jones | 52/713 |
| 5,611,179 A | * | 3/1997 | Leek | 52/293.3 |

(Continued)

*Primary Examiner* — Beth Stephan
(74) *Attorney, Agent, or Firm* — Gardere Wynne Sewell LLP; Andre M. Szuwalski (57) ABSTRACT

A post member includes a side surface, and a beam member includes a side surface and an underside edge surface. The beam member is attached to the post member using a multi-piece hanger including a first L-shaped bracket with a first mounting flange attached to the side surface of the post member, and a second L-shaped bracket with a second mounting flange attached to the side surface of the beam member. The first L-shaped bracket further includes a first interlocking flange supporting the underside edge surface of the beam member. The first interlocking flange includes an extending tab member. The second L-shaped bracket further includes a second interlocking flange positioned adjacent the first interlocking flange. At a bend of the second L-shaped bracket, at least one slot is provided which is sized and shaped to receive the extending tab member.

20 Claims, 8 Drawing Sheets

(56) References Cited

U.S. PATENT DOCUMENTS

| | | | |
|---|---|---|---|
| 5,966,893 A * | 10/1999 | Quillin | 52/713 |
| 6,012,690 A * | 1/2000 | Cohen | 248/226.11 |
| 6,128,883 A * | 10/2000 | Hatzinikolas | 52/698 |
| 6,213,679 B1 * | 4/2001 | Frobosilo et al. | 403/403 |
| 6,240,682 B1 * | 6/2001 | James et al. | 52/90.2 |
| 6,375,137 B1 * | 4/2002 | McQuade et al. | 248/205.1 |
| 6,612,087 B2 * | 9/2003 | diGirolamo et al. | 52/712 |
| 7,637,065 B2 * | 12/2009 | Ahren et al. | 52/506.06 |
| 7,677,514 B1 * | 3/2010 | Palmer | 248/250 |
| 7,712,283 B2 * | 5/2010 | Gadd et al. | 52/713 |
| 2002/0062617 A1 * | 5/2002 | diGirolamo et al. | 52/688 |
| 2008/0283702 A1 * | 11/2008 | Ikerd | 248/228.1 |
| 2009/0211177 A1 * | 8/2009 | Grafton et al. | 52/93.1 |
| 2010/0215429 A1 * | 8/2010 | Raye et al. | 403/408.1 |
| 2011/0243644 A1 * | 10/2011 | Jarvis | 403/25 |

\* cited by examiner

MULTI-PIECE HANGER FOR A POST-TO-BEAM CONNECTION

PRIORITY CLAIM

This application claims priority from U.S. Provisional Application for Patent No. 61/663,979 filed Jun. 25, 2012, the disclosure of which is incorporated by reference.

BACKGROUND OF THE INVENTION

1. Technical Field of the Invention

The present invention relates generally to a hanger for supporting a connection between two structural members and, in particular, a hanger for supporting a post-to-beam connection.

2. Description of Related Art

Figure 1:
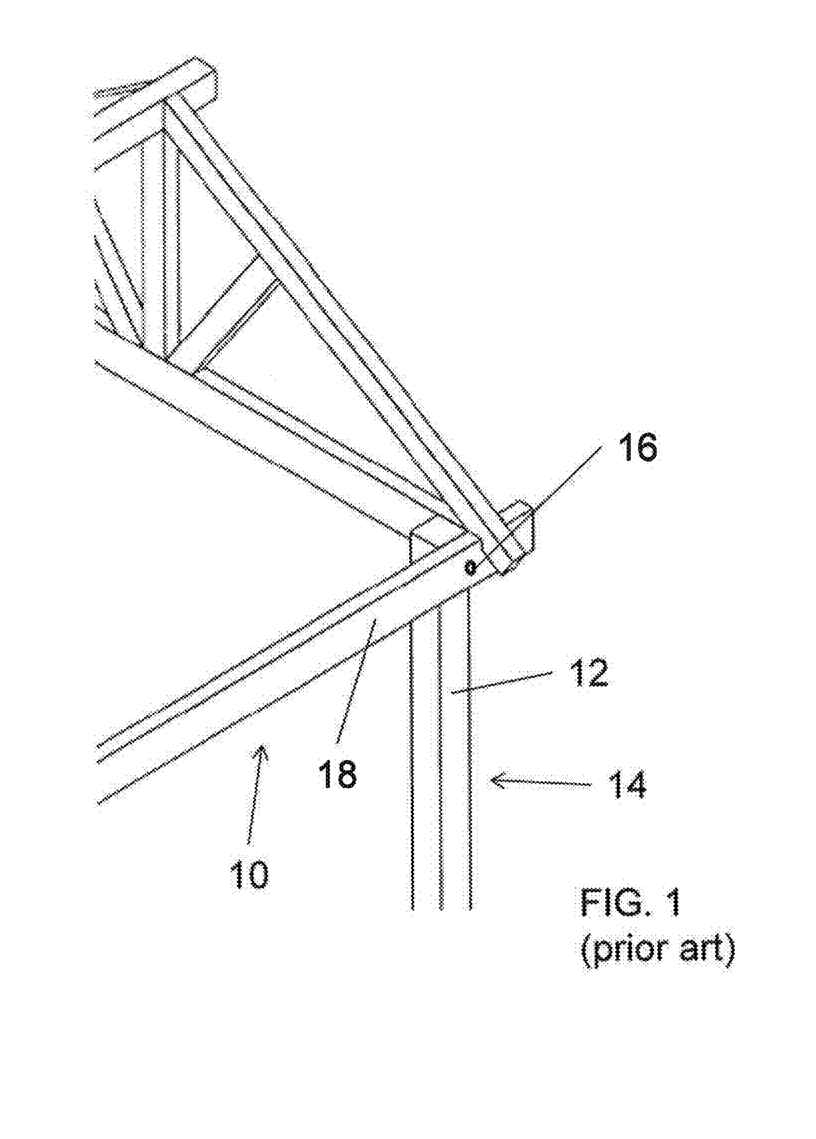
FIG. 1 is a perspective view of a prior art post-to-beam attachment configuration.

Many construction projects require the attachment of a horizontally extending structural member to a side surface of a vertically extending structural member. One specific example of such a project concerns the attachment of a beam member 10 to the side surface 12 of a post member 14 as shown in FIG. 1. It is typical to make this attachment by driving a mounting device 16, such as a nail, screw or bolt, into the side surface 18 of the beam member 10, through the beam member and into the post member 14. The mounting device 16 in this configuration, however, may not be capable of supporting a large load on the beam member 10. As a result of excessive loading, the mounting device connection may fail.

To provide for improved structural support there would be an advantage to instead use a hanger (clip or bracket) which is secured to the side surface of a post member and further supports an underside surface of the beam member. A number of exemplary hangers of this type are known in the art. However, these hangers suffer from a number of drawbacks.

First, the hangers are typically made of stamped and folded galvanized steel and thus possess a utilitarian appearance driven by functional configuration. In most applications, it is preferred that such galvanized hangers and other such hardware not be visible. It is thus typical for some form of finish carpentry to be used to conceal the hanger from view. For example, the finish carpentry may box or case around the hanger with wood trim pieces of a type similar to, or complementary of, the post and beam members. There is accordingly an added cost to use of such galvanized hangers that is associated with the need to hide the hanger itself.

Second, the hangers are typically manufactured with sizes specifically selected for commonly used dimensional structural members (i.e., dimensional lumber). It is known in the art that the stated dimensional size of a wood structural member is not the actual dimensional size. For example, a 2×6 wood beam will not typically measure two actual inches in thickness and six actual inches in width. This is especially the case when the wood structural member is something other than "rough cut" (where rough cut members more conventionally are dimensionally accurate or close to dimensionally accurate). The differences in size may, for example, be geographic such that a 2×6 wood beam in one geographic region is one size and a 2×6 wood beam in another geographic region is another size. Alternatively, the differences in size may vary from lumber mill to lumber mill, or vary depending on the treatment made to the wood. It is not uncommon for a "2×6" wood beam to have thicknesses varying from 1.5 to 2.0 inches and widths varying from 5.5 inches to 6.0 inches. The conventional galvanized hangers, constructed solely for commonly encountered dimensions, are not well suited to handle the dimensional variability of structural members, and in particular are not configured to adjust to differences in thickness.

What is needed is a post-to-beam hanger which supports the underside surface of the beam along with secure attachment to the post, is adjustable to handle dimensional variability of structural members and is configured to present an attractive appearance obviating the need for finish concealment.

SUMMARY

In an embodiment, a multi-piece hanger comprises: a first L-shaped bracket having a first mounting flange and a first interlocking flange, the first interlocking flange including an extending tab member; and a second L-shaped bracket having a second mounting flange and a second interlocking flange, and further including, at a bend, at least one slot sized and shaped to receive the extending tab member when the first interlocking flange and second interlocking flange are positioned adjacent each other.

In an embodiment, a multi-piece hanger comprises: an L-shaped bracket having a first mounting flange and an interlocking flange, the interlocking flange including an extending tab member; and a plate member having a second mounting flange and further at least one slot sized and shaped to receive the extending tab member.

In an embodiment, an apparatus comprises: a post member having a side surface; a beam member having a side surface and an underside edge surface; a first L-shaped bracket having a first mounting flange attached to the side surface of the post member, and further including a first interlocking flange supporting the underside edge surface of the beam member, the first interlocking flange including an extending tab member; and a second L-shaped bracket having a second mounting flange attached to the side surface of the beam member, and further including a second interlocking flange positioned adjacent the first interlocking flange, and further including, at a bend, at least one slot sized and shaped to receive the extending tab member.

In an embodiment, an apparatus comprises: a post member having a side surface; a beam member having a side surface and an underside edge surface; an L-shaped bracket having a first mounting flange attached to the side surface of the post member, and further including an interlocking flange supporting the underside edge surface of the beam member, the interlocking flange including an extending tab member; and a plate bracket having a second mounting flange attached to the side surface of the beam member, and further including at least one slot sized and shaped to receive the extending tab member.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 2:
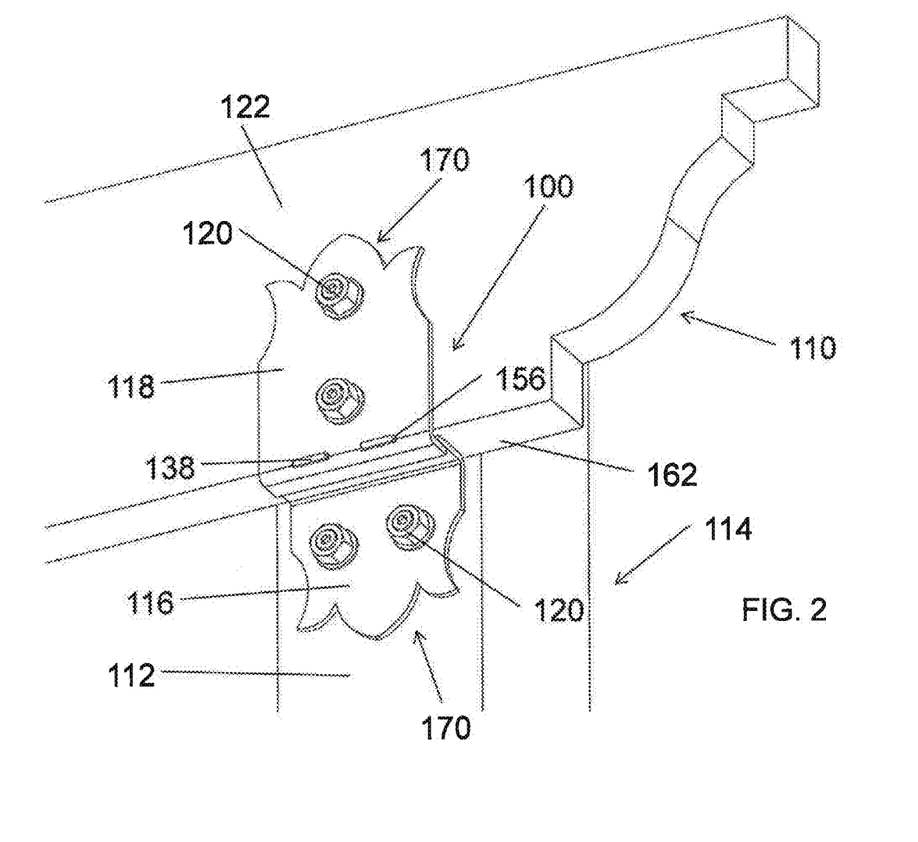
FIG. 2 is a perspective view of a multi-piece post-to-beam hanger.

Reference is now made to FIG. 2 which shows a perspective view of a multi-piece post-to-beam hanger 100 used for attaching a first structural (beam) member 110 to the side surface 112 of a second structural (post) member 114. The hanger 100 includes a first (post) bracket 116 and a second (beam) bracket 118 which interlock with each other in a manner to be described in detail below. A mounting device 120, such as a screw or bolt, is used to attach the post bracket 116 to the side surface 112 of the post member 114. A mounting device 120 is also used to attach the beam bracket 118 to a side surface 122 of the beam member 110 and further to attach the beam member 110 to the side surface 112 of the post member 114.

The post bracket 116 and beam bracket 118 may be made from steel sheet cut in a desired pattern and shaped, for example by bending, into a desired shape. The steel may be coated by painting or powder coating. The surface may be smooth or distressed. Alternatively, the post bracket 116 and beam bracket 118 may cast or otherwise molded.

Figure 3:
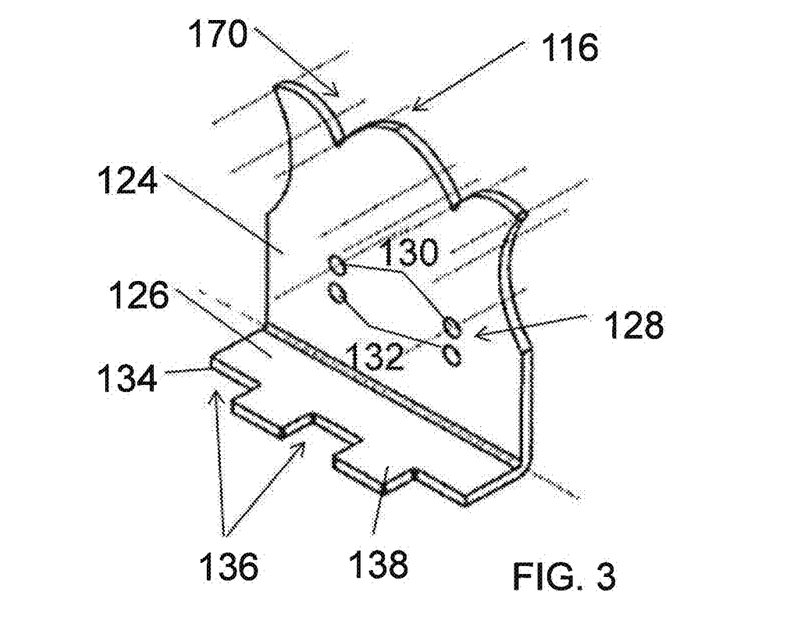
FIG. 3 is a perspective view of a post bracket in the hanger of FIG. 2.

Reference is now made to FIG. 3 which shows a perspective view of the post bracket 116 in the multi-piece post-to-beam hanger 100 of FIG. 2. The post bracket 116 has an L-shape including a mounting flange 124 and an interlocking flange 126. The bend in the L-shape of the post bracket 116 is substantially ninety degrees.

A central portion of the mounting flange 124 includes a plurality of mounting openings 128. The mounting openings 128 are configured to receive a mounting device 120 (such as a screw or bolt) for attaching the post bracket 116 to the side surface 112 of the post member 114 (FIG. 2). The mounting openings 128 comprise an upper pair of openings 130 and a lower pair of openings 132.

Figure 5:
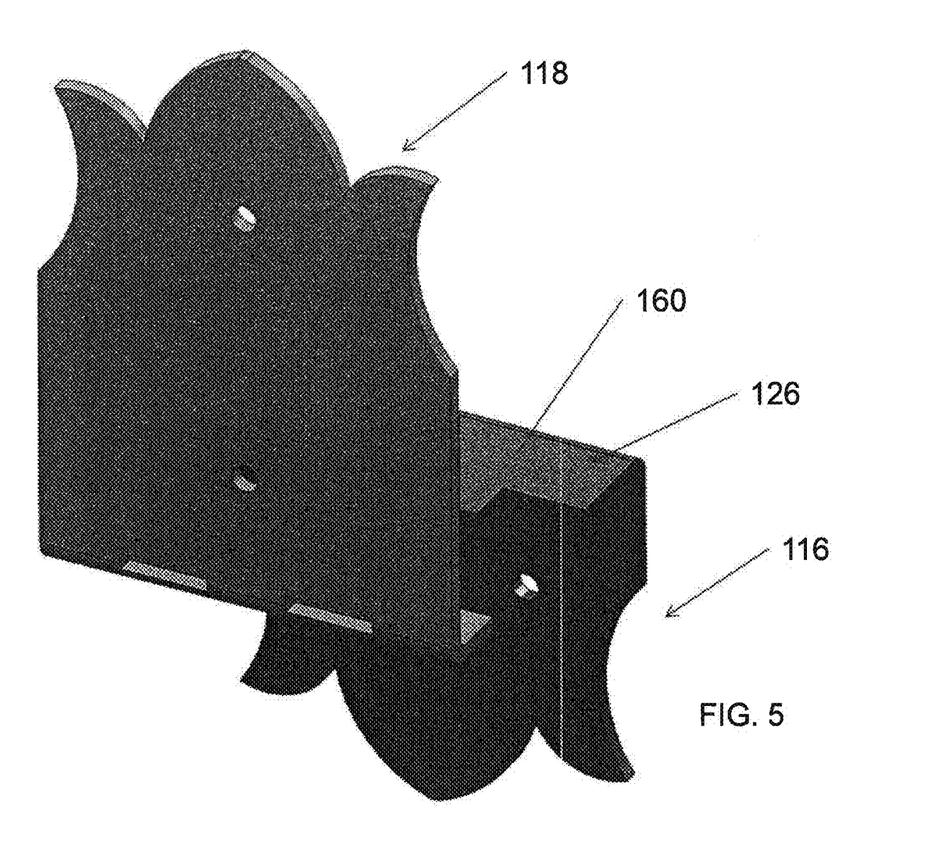
FIG. 5 is an exploded perspective view of the relationship between the post bracket and beam bracket prior to interlocking.

The reason for providing two pairs of openings is to allow adjustment in relative positioning and separation of the mounting devices 120. It will be noted that only one pair of openings will typically be used on the post bracket 116. To hide the unused pair of openings, the mounting devices 120 may be sized to cover both pairs of openings when installed, or may use other techniques, such as a washer or other structure, sized sufficient to cover both pairs of openings. It will be understood that only one pair of openings could be provided as shown in FIG. 5.

An end edge 134 of the interlocking flange 126 includes a plurality of cut-outs 136 which define at least one tab (or projection) 138.

Figure 7:
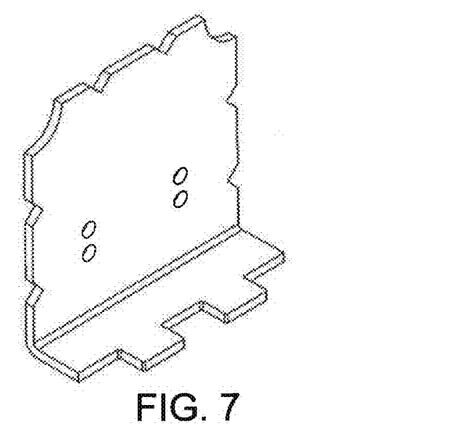
FIGS. 7-9 illustrate perspective views of post brackets having different ornamental features.
Figure 8:
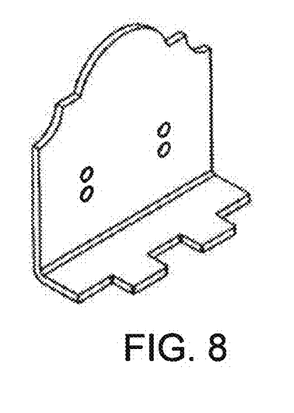
Figure 9:
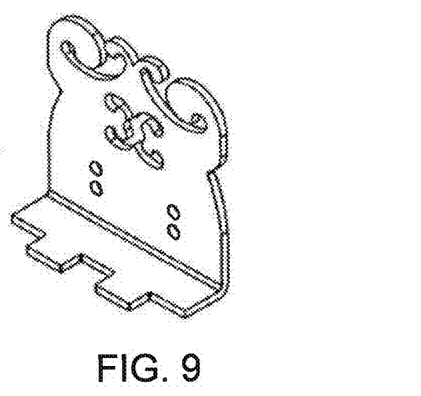

An upper portion of the mounting flange 24, and specifically a peripheral edge, may include ornamental features 170. FIGS. 2-3 show one example of an ornamental feature 170 design. See FIGS. 7-9 for other examples of ornamental feature designs. This difference in ornamental design, while retaining a common design and placement of the cut-outs 136 and tabs 138, is important because it allows for the post brackets to be interchanged. Such an interchange may occur in connection with a renovation where the architectural and ornamental style of the construction changes. New post brackets 116, matching the new architectural and ornamental style, can be easily installed.

Figure 4:
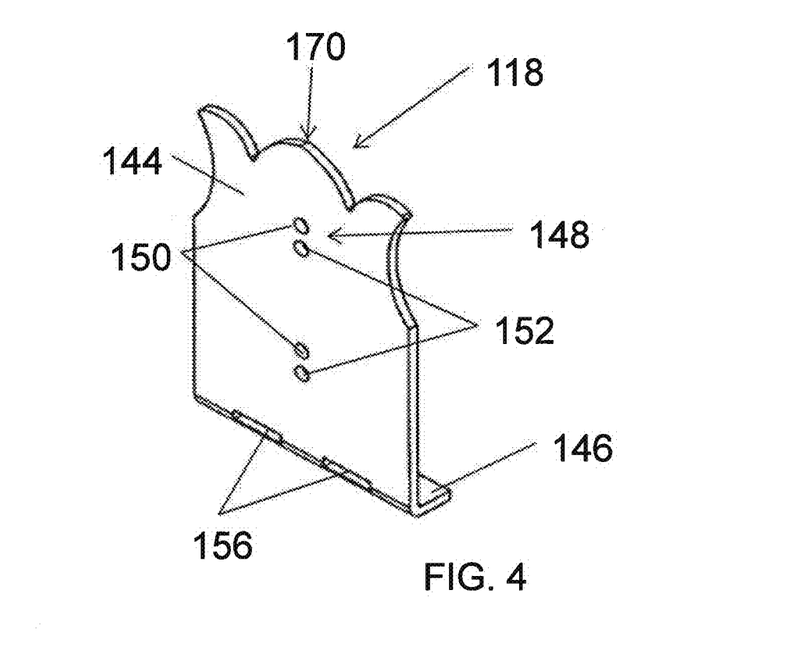
FIG. 4 is a perspective view of a beam bracket in the hanger of FIG. 2.

Reference is now made to FIG. 4 which shows a perspective view of the beam bracket 118 in the multi-piece post-to-beam hanger 100 of FIG. 2. The beam bracket 118 has an L-shape including a mounting flange 144 and an interlocking flange 146. The bend in the L-shape of the beam bracket 118 is substantially ninety degrees.

A central portion of the mounting flange 144 includes a plurality of mounting openings 148. The mounting openings 148 are configured to receive a mounting device 120 (such as a screw or bolt) for attaching the beam bracket 118 to a side surface 122 of the beam member 110 and further to attach the beam member 110 to the side surface 112 of the post member 114 (FIG. 2). The mounting openings 148 comprise an upper pair of openings 150 and a lower pair of openings 152.

The reason for providing two pairs of openings is to allow adjustment in relative positioning and separation of the mounting devices 120. It will be noted that only one pair of openings will typically be used on the beam bracket 118. To hide the unused pair of openings, the mounting devices 120 may be sized to cover both pairs of openings when installed, or may use other techniques, such as a washer or other structure, sized sufficient to cover both pairs of openings. It will be understood that only one pair of openings could be provided as shown in FIG. 5.

At the bend where the mounting flange 144 meets the interlocking flange 146, at least one slot (aperture) 156 is formed. The slots 156 are sized and shaped to receive corresponding tabs 138 (FIG. 3) as formed by the cut-outs 136 in edge 134 of the interlocking flange 126. The interlocking of the post bracket 116 and beam bracket 118 through the tabs 138 and slots 156 is shown in FIG. 2.

Figure 10:
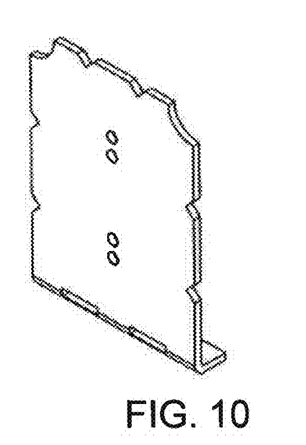
FIGS. 10-12 illustrate perspective views of beam brackets having different ornamental features.
Figure 11:
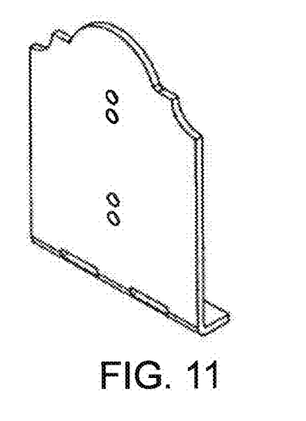
Figure 12:
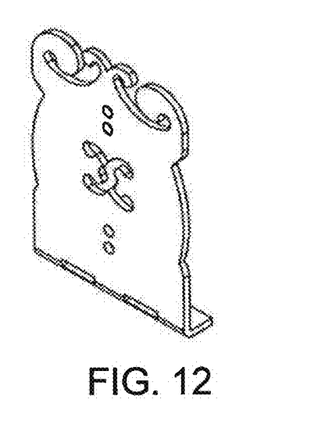

An upper portion of the mounting flange 144, and specifically a peripheral edge, may include ornamental features 170. FIGS. 2 and 4 show one example of an ornamental feature 170 design. See FIGS. 10-12 for other examples of ornamental feature designs. This difference in ornamental design, while retaining a common design and placement of the slots 156, is important because it allows for the beam brackets to be interchanged. Such an interchange may occur in connection with a renovation where the architectural and ornamental style of the construction changes. New beam brackets 118, matching the new architectural and ornamental style, can be easily installed.

Figure 4A:
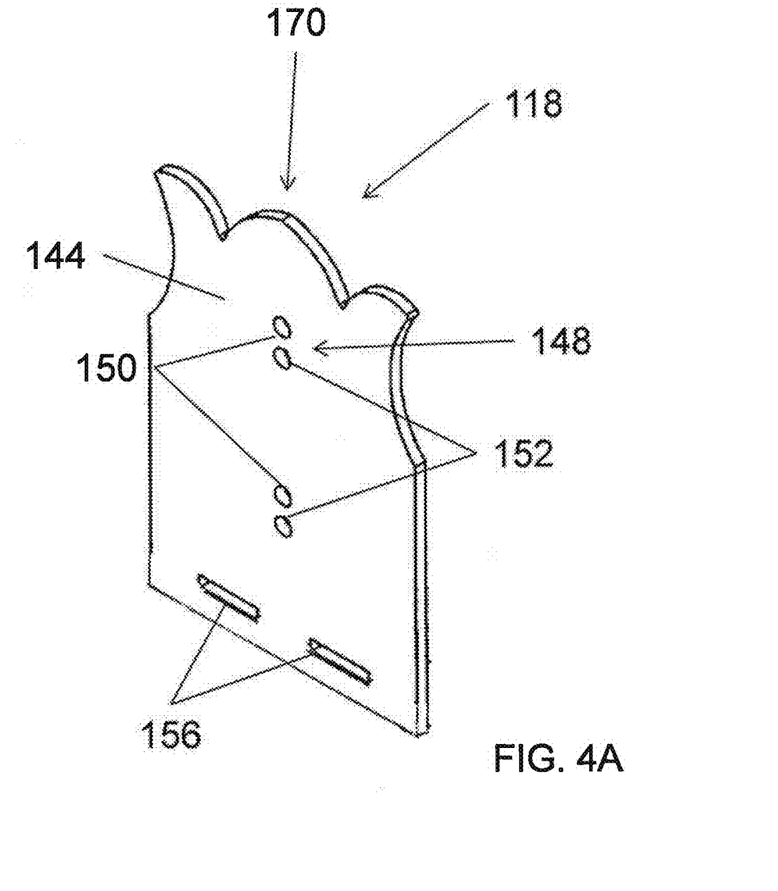
FIG. 4A is a perspective view of an alternative embodiment for the beam bracket.

Reference is now made to FIG. 4A which shows a perspective view of an alternative embodiment for the beam bracket 118 in the multi-piece post-to-beam hanger 100 of FIG. 2. While FIG. 4 illustrated a beam bracket 118 with an L-shape, the beam bracket of 118 of FIG. 4A is configured as a plate member for the mounting flange 144. For example, the beam bracket 118 of FIG. 4A is manufactured by not forming the bend as shown in FIG. 4. A bottom portion of the beam bracket 118 in FIG. 4A is configured to include at least one slot (aperture) 156. The slots 156 are sized and shaped to receive corresponding tabs 138 (FIG. 3) as formed by the cut-outs 136 in edge 134 of the interlocking flange 126. An interlocking of the post bracket 116 and beam bracket 118 is made through the tabs 138 and slots 156.

Figure 6:
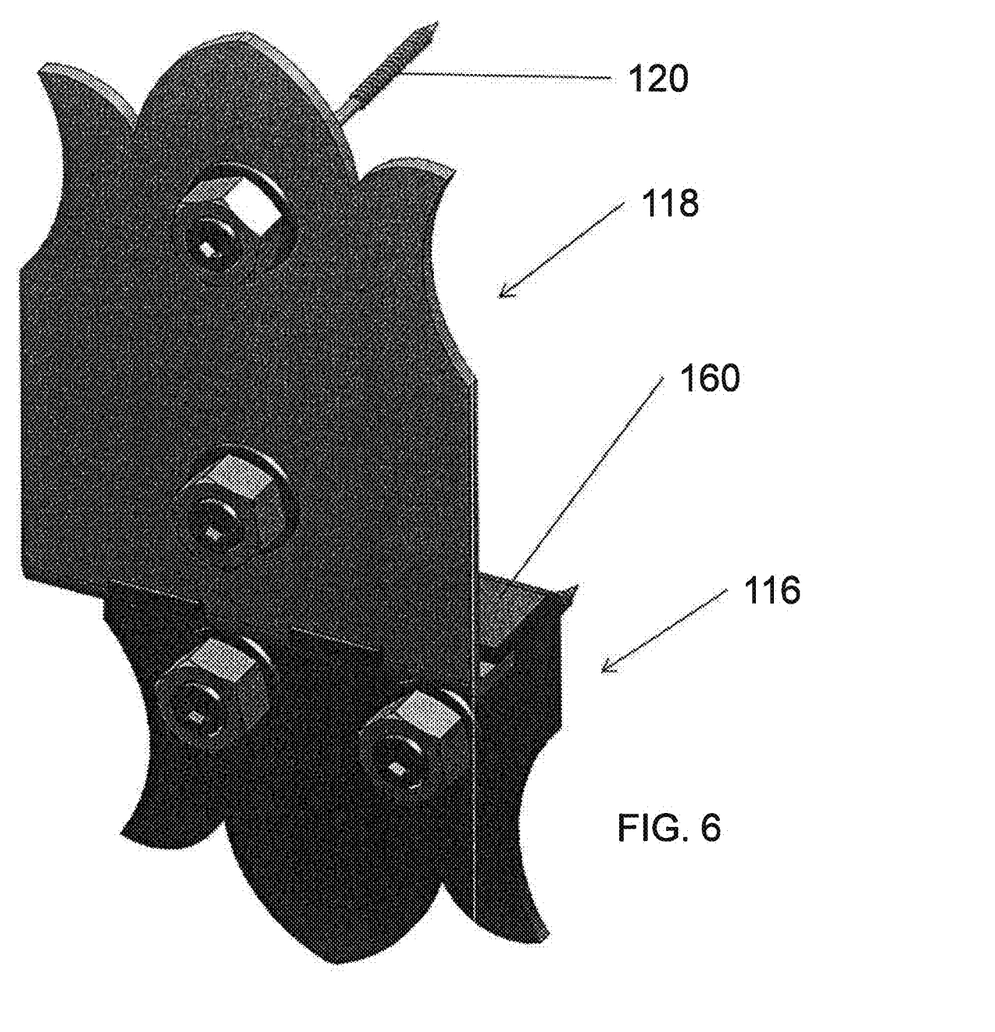
FIG. 6 is a perspective view of the interlocked relationship between the post bracket and beam bracket.

FIG. 5 shows an exploded perspective view of the relationship between the post bracket 116 and beam bracket 118 prior to interlocking. FIG. 6 shows a perspective view of the interlocked relationship between the post bracket 116 and beam bracket 118. FIG. 6 further shows the use of mounting devices 120.

FIGS. 5 and 6 further show that the interlocking flange 126 of the post bracket 116 includes a support surface 160. This support surface 160 is used to support an edge surface 162 on the underside of the beam member 110 (see, FIG. 2).

Figure 13:
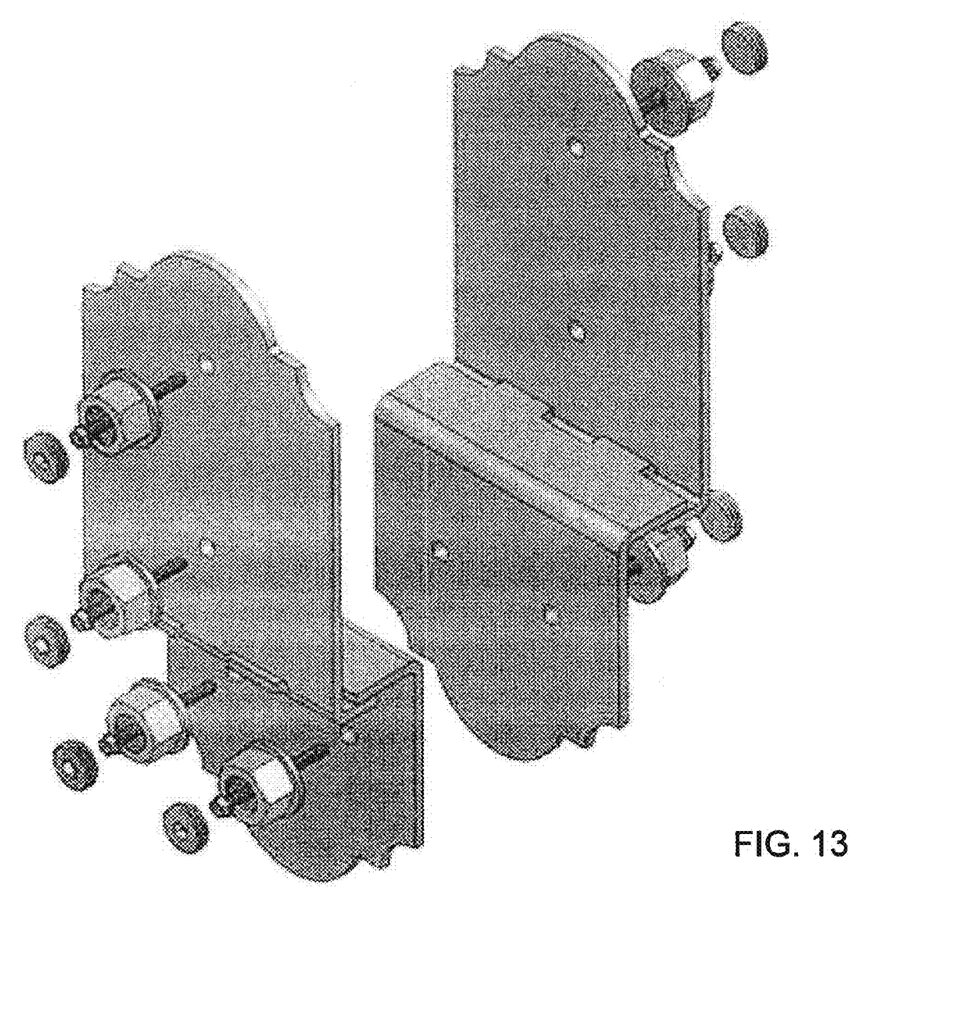
FIG. 13 illustrates an exploded perspective view of use of the multi-piece post-to-beam hanger on opposite sides of a post to support two beams.

Reference is now made to FIG. 13 wherein there is shown an exploded perspective view of use of the multi-piece post-to-beam hanger on opposite sides of a post to support two beams.

In assembling the multi-piece post-to-beam hanger 100, the user selects the desired post bracket 116 and beam bracket 118 (based for example on ornamental features). The post bracket 116 is positioned on the side surface 112 of the post member 114 such that the support surface 160 provided by the interlocking flange 126 is set at a desired height for the beam member 110. Mounting devices 120 are then used to attach the post bracket 116 to the post member 114. The beam member 110 may then be placed to rest on the support surface 160 provided by the interlocking flange 126. This is advantageous because it obviates the need to manually hold the beam member in place at the desired height during beam installation. The beam bracket 118 is then positioned on the side surface 122 of the beam member 110 with the interlocking flange 146 underneath the interlocking flange 126 and the tabs 138 formed by the cut-outs 136 in the edge 134 of the interlocking flange 126 inserted into the slots 156 formed at the bend where the mounting flange 144 meets the interlocking flange 146. Mounting devices 120 are then used to attach the beam bracket 118 to both the beam member 110 and the post member 114.

As an alternative construction, a separate mounting device (such as a screw or bolt) may be used to attach the beam member 110 to the post member 114 prior to installation of the beam bracket 118. With this construction, the separate mounting device must be countersunk or recessed into the surface 122 of the beam member 110. The beam bracket 118 is then positioned on the side surface 122 of the beam member 110 with the interlocking flange 146 underneath the interlocking flange 126 and the tabs 138 formed by the cut-outs 136 in the edge 134 of the interlocking flange 126 inserted into the slots 156 formed at the bend where the mounting flange 144 meets the interlocking flange 146. Mounting devices 120 are then used to attach the beam bracket 118 to the beam member 110.

To address the issue of dimensional variability with respect to the beam member 110, the tabs 138 formed by the cut-outs 136 in the edge 134 of the interlocking flange 126 are sized to support a range from the largest to the smallest expected dimensional thickness for the beam member 110 (i.e., the thickness of edge surface 162). Thus, when a thicker beam member 110 is used, the tabs 138 will still engage the slots 156. However, when a thinner beam member 110 is used, the tabs 138 will pass further through the slots 156 to accommodate the thinner beam member while maintaining a flush attachment of the mounting flange 144 to the side surface 122 of the beam member 110. In an implementation, the tabs 138 formed by the cut-outs 136 may present a tab length of about 0.5 inches. This tab length permits a range of adjustment interlocked positioning of the beam bracket 118 relative to the post bracket 116 so that the beam bracket 118 can be positioned flush against the side surface of the beam member, no matter its actual dimensional size.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A multi-piece hanger, comprising:
a first L-shaped bracket having a first mounting flange and a first interlocking flange extending therefrom, the first interlocking flange including a distal end spaced from the first mounting flange and having an extending tab member positioned between cutouts in the distal end of the first interlocking flange; and
a second L-shaped bracket having a second mounting flange and a second interlocking flange extending therefrom at a bend, and further including, at the bend, at least one slot sized and shaped to receive the extending tab member so that at least a portion of the extending tab member extends through the at least one slot to allow for adjustment of a distance between the first mounting flange and the second mounting flange to account for various sizes of a beam member when the first interlocking flange and second interlocking flange are positioned adjacent each other and the first mounting flange is coupled to a post member and the second mounting flange is coupled to the beam member.

2. The hanger of claim 1, wherein the first interlocking flange is oriented perpendicular to the first mounting flange and the second interlocking flange is oriented perpendicular to the second mounting flange.

3. The hanger of claim 1, wherein each of the first and second mounting flanges includes a central portion including at least one mounting opening configured to receive a mounting device.

4. The hanger of claim 3, wherein said at least one opening comprises at least one pair of openings.

5. The hanger of claim 4, wherein said at least one pair of openings comprises at least two pairs of openings.

6. The hanger of claim 5, wherein adjacent openings in the at least two pairs of openings are spaced apart from each other by a distance selected such that the mounting device, when installed in one of the adjacent openings, covers both adjacent openings.

7. The hanger of claim 3, wherein said at least one mounting opening comprises a first and a second adjacent openings.

8. The hanger of claim 7, wherein the first and second adjacent openings are spaced apart from each other by a distance selected such that the mounting device, when installed in one of the first and second adjacent openings, covers both the first and second adjacent openings.

9. The hanger of claim 1, wherein each of the first and second mounting flanges includes a portion with an ornamental design edge.

10. The hanger of claim 1, wherein the first mounting flange is configured for attachment to a first surface of the post member, the second mounting flange is configured for attachment to a first surface of the beam member, said first surface of the post member and said first surface of the beam member being parallel to each other, and the first interlocking flange is configured to support a second surface of the beam member, said second surface of the beam member being perpendicular to the first surface of the post member.

11. The hanger of claim 10, wherein the post member is a vertical post and the beam member is a horizontal beam.

12. A multi-piece hanger, comprising:
a first L-shaped bracket having a first mounting flange and a first interlocking flange extending therefrom, the first interlocking flange including a distal end spaced from the first mounting flange and having an extending tab member positioned between recessed cutout portions in the distal end of the first interlocking flange; and a second L-shaped bracket having a second mounting flange and a second interlocking flange extending therefrom at a bend and at least one slot at the bend, wherein the extending tab member of the first L-shaped bracket extends through the at least one slot to allow for adjustment of a distance between the first mounting flange and the second mounting flange to account for various sizes of a beam member when the first interlocking flange and second interlocking flange are positioned adjacent each other and the first mounting flange is coupled to a post member and the second mounting flange is coupled to the beam member.

13. The hanger of claim 12, wherein each of the first and second mounting flanges includes a central portion including at least one mounting opening configured to receive a mounting device.

14. The hanger of claim 13, wherein said at least one mounting opening comprises first and second adjacent openings.

15. The hanger of claim 14, wherein the first and second adjacent openings are spaced apart from each other by a distance selected such that the mounting device, when installed in one of the first and second adjacent openings, covers both the first and second adjacent openings.

16. The hanger of claim 12, wherein each of the first and second mounting flanges includes a portion with an ornamental design edge comprising at least one non-linear portion.

17. The hanger of claim 12, wherein the first mounting flange is configured for attachment to a first surface of a post member, the second mounting flange is configured for attachment to a first surface of the beam member, said first surface of the post member and said first surface of the beam member being parallel to each other, and the first interlocking flange is configured to support a second surface of the beam member, said second surface of the beam member being perpendicular to the first surface of the post member.

18. The hanger of claim 17, wherein the first structural member is a post and the second structural member is a beam.

19. Apparatus, comprising:
a post member having a side surface;
a beam member having a side surface and an underside edge surface;
a first L-shaped bracket having a first mounting flange attached to the side surface of the post member, and further including a first interlocking flange supporting the underside edge surface of the beam member, the first interlocking flange including an extending tab member positioned between cutouts in the first interlocking flange; and
a second L-shaped bracket having a second mounting flange attached to the side surface of the beam member, and further including a second interlocking flange positioned adjacent the first interlocking flange, and further including, at a bend, at least one slot sized and shaped to receive the extending tab member so that at least a portion of the extending tab member extends through the at least one slot to allow for adjustment of a distance between the first mounting flange and the second mounting flange to account for various sizes of the beam member.

20. Apparatus, comprising:
a post member having a side surface;
a beam member having a side surface and an underside edge surface;
a first L-shaped bracket having a first mounting flange attached to the side surface of the post member, and further including an interlocking flange supporting the underside edge surface of the beam member, the interlocking flange including an extending tab member; and
a second L-shaped bracket having a second mounting flange attached to the side surface of the beam member, and further including at least one slot, wherein the extending tab member is movably positioned in the at least one slot to allow for adjustment of a distance between the first mounting flange and the second mounting flange to account for various sizes of the beam member.

* * * * *

UNITED STATES PATENT AND TRADEMARK OFFICE
CERTIFICATE OF CORRECTION

PATENT NO. : 9,010,062 B2  
APPLICATION NO. : 13/926351  
DATED : April 21, 2015  
INVENTOR(S) : Ian A. Hill Page 1 of 1

It is certified that error appears in the above-identified patent and that said Letters Patent is hereby corrected as shown below:

In the Specification:

At column 3, line number 63, please correct the reference number [24] to -- 124 --.

In the Claims:

At column 6, claim number 7, line number 45, both instances of the word "a" were stricken in an Examiner's Amendment dated December 15, 2014. Please correct Claim 7 as follows:

7.      The hanger of claim 3, wherein said at least one mounting opening comprises [a] first and [a] second adjacent openings.

Signed and Sealed this  
Fourth Day of August, 2015

Michelle K. Lee  
*Director of the United States Patent and Trademark Office*